(12) United States Patent
Moore

(10) Patent No.: US 10,666,800 B1
(45) Date of Patent: *May 26, 2020

(54) IVR ENGAGEMENTS AND UPFRONT BACKGROUND NOISE

(71) Applicant: OPEN INVENTION NETWORK LLC, Durham, NC (US)

(72) Inventor: Shelley L. Moore, Omaha, NE (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,503

(22) Filed: Jan. 29, 2019

Related U.S. Application Data

(63) Continuation of application No. 15/621,095, filed on Jun. 13, 2017, now Pat. No. 10,194,026, which is a continuation of application No. 15/369,342, filed on Dec. 5, 2016, now Pat. No. 9,680,992, which is a continuation of application No. 14/226,472, filed on Mar. 26, 2014, now Pat. No. 9,516,165.

(51) Int. Cl.
| | |
|---|---|
| *H04M 3/18* | (2006.01) |
| *H04M 3/493* | (2006.01) |
| *G10L 25/84* | (2013.01) |
| *G10L 15/20* | (2006.01) |
| *H04M 7/12* | (2006.01) |
| *G10L 15/22* | (2006.01) |

(52) U.S. Cl.
CPC .......... *H04M 3/4936* (2013.01); *G10L 15/20* (2013.01); *G10L 15/22* (2013.01); *G10L 25/84* (2013.01); *H04M 7/1295* (2013.01); *H04M 3/18* (2013.01); *H04M 2201/40* (2013.01)

(58) Field of Classification Search
CPC ......... G10L 15/20; G10L 15/22; G10L 17/00; G10L 25/84; G10L 17/04; G10L 21/0216; H04M 1/64; H04M 2201/40; H04M 3/18; H04M 3/4936; H04M 7/1295; H04R 29/00
USPC ..... 375/346; 379/88.01, 88.04, 88.18, 93.03, 379/202.01, 235; 455/411, 414.1, 563; 701/36; 704/233, 246, 251, 257, 9, 222, 704/236, 244, 253, 270, 275, 226, 231, 704/235, 249, 270.1; 715/728, 716; 381/94.1; 700/94
See application file for complete search history.

(56) References Cited

U.S. PATENT DOCUMENTS

| | | | | |
|---|---|---|---|---|
| 4,558,459 A | * | 12/1985 | Noso .................. | B60R 16/0373 381/57 |
| 4,696,041 A | * | 9/1987 | Sakata ................. | G10L 25/87 704/233 |
| 4,918,732 A | * | 4/1990 | Gerson ................ | G10L 15/00 704/233 |
| 5,008,941 A | * | 4/1991 | Sejnoha .............. | G10L 15/07 704/222 |
| 5,983,186 A | * | 11/1999 | Miyazawa ........... | G10L 15/26 704/233 |
| 6,044,343 A | * | 3/2000 | Cong .................. | G10L 15/063 704/222 |
| 6,243,454 B1 | * | 6/2001 | Eslambolchi ........ | H04M 3/40 370/260 |

(Continued)

Primary Examiner — Gerald Gauthier

(57) ABSTRACT

Embodiments of the present invention pertain to reducing or eliminating speech recognition error when background noise is detected at a caller's location. For example, when background noise is detected at the caller's location, the caller may be prompted to use dual-tone multi-frequency (DTMF).

20 Claims, 3 Drawing Sheets

(56) References Cited

U.S. PATENT DOCUMENTS

| | | | |
|---|---|---|---|
| 6,453,041 B1 | 9/2002 | Eryilmaz | |
| 6,584,180 B2* | 6/2003 | Nemoto | H04M 1/642 |
| | | | 379/88.01 |
| 6,631,348 B1* | 10/2003 | Wymore | G10L 15/20 |
| | | | 704/233 |
| 7,167,544 B1* | 1/2007 | Bauer | G10L 15/22 |
| | | | 379/88.01 |
| 7,403,766 B2* | 7/2008 | Hodge | H04M 1/67 |
| | | | 455/411 |
| 7,822,498 B2* | 10/2010 | Charoenruengkit | G11B 27/28 |
| | | | 369/4 |
| 9,288,594 B1* | 3/2016 | Polansky | G10L 19/00 |
| 9,495,960 B1* | 11/2016 | Moore | G10L 21/0216 |
| 9,516,165 B1* | 12/2016 | Moore | G10L 15/22 |
| 9,640,196 B1* | 5/2017 | Moore | G10L 21/0216 |
| 9,680,992 B1* | 6/2017 | Moore | G10L 15/22 |
| 9,721,565 B2* | 8/2017 | Perlmutter | G10L 15/30 |
| 9,812,123 B1* | 11/2017 | Sanders | H04M 3/4936 |
| 2003/0027602 A1 | 2/2003 | Han et al. | |
| 2003/0158732 A1* | 8/2003 | Pi | G01S 13/66 |
| | | | 704/251 |
| 2003/0167171 A1* | 9/2003 | Calderone | 704/270 |
| 2005/0171664 A1* | 8/2005 | Konig | G10L 15/22 |
| | | | 701/36 |
| 2006/0009974 A1* | 1/2006 | Junqua | G10L 15/083 |
| | | | 704/257 |
| 2006/0009980 A1* | 1/2006 | Burke | G10L 15/32 |
| | | | 704/270 |
| 2006/0126803 A1* | 6/2006 | Patel | H04M 3/5166 |
| | | | 379/88.01 |
| 2006/0200345 A1* | 9/2006 | Kooiman | G10L 15/20 |
| | | | 704/233 |
| 2006/0200348 A1* | 9/2006 | Knott | G10L 15/22 |
| | | | 704/246 |
| 2006/0265219 A1* | 11/2006 | Honda | G10L 21/0208 |
| | | | 704/233 |
| 2007/0047719 A1* | 3/2007 | Dhawan | H04M 1/2478 |
| | | | 379/235 |
| 2007/0050190 A1* | 3/2007 | Washio | G10L 15/22 |
| | | | 704/249 |
| 2007/0237271 A1* | 10/2007 | Pessoa | G10L 21/0208 |
| | | | 375/346 |
| 2007/0276662 A1* | 11/2007 | Akamine | G10L 15/065 |
| | | | 704/233 |
| 2008/0077403 A1* | 3/2008 | Hayakawa | G10L 15/20 |
| | | | 704/233 |
| 2008/0101556 A1* | 5/2008 | Kim | G10L 15/01 |
| | | | 379/88.04 |
| 2008/0118042 A1* | 5/2008 | Hogg | H04M 3/2281 |
| | | | 379/93.03 |
| 2008/0152094 A1* | 6/2008 | Perlmutter | G10L 15/30 |
| | | | 379/88.01 |
| 2008/0167868 A1* | 7/2008 | Kanevsky | G10L 15/20 |
| | | | 704/233 |
| 2009/0055175 A1* | 2/2009 | Terrell, II | G10L 15/01 |
| | | | 704/235 |
| 2009/0076813 A1* | 3/2009 | Jung | G10L 15/20 |
| | | | 704/233 |
| 2009/0187402 A1* | 7/2009 | Scholl | G10L 15/01 |
| | | | 704/233 |
| 2009/0198492 A1* | 8/2009 | Rempel | G10L 15/20 |
| | | | 704/233 |
| 2009/0222265 A1* | 9/2009 | Iwamiya | G10L 15/22 |
| | | | 704/246 |
| 2010/0049525 A1* | 2/2010 | Paden | G10L 15/22 |
| | | | 704/270.1 |
| 2010/0121636 A1* | 5/2010 | Burke | H04R 1/08 |
| | | | 704/233 |
| 2010/0153104 A1* | 6/2010 | Yu | G10L 21/0208 |
| | | | 704/233 |
| 2010/0180202 A1* | 7/2010 | Del Valle Lopez | G06F 3/048 |
| | | | 715/728 |
| 2010/0183126 A1* | 7/2010 | Chambers | G10L 15/20 |
| | | | 379/88.04 |
| 2011/0111805 A1* | 5/2011 | Paquier | H04M 1/72552 |
| | | | 455/563 |
| 2011/0184724 A1* | 7/2011 | Ranjan | G10L 15/193 |
| | | | 704/9 |
| 2012/0034904 A1* | 2/2012 | LeBeau | H04M 1/72522 |
| | | | 455/414.1 |
| 2012/0035924 A1* | 2/2012 | Jitkoff | G10L 15/30 |
| | | | 704/235 |
| 2013/0185065 A1* | 7/2013 | Tzirkel-Hancock | G10L 15/20 |
| | | | 704/233 |
| 2013/0185066 A1* | 7/2013 | Tzirkel-Hancock | G10L 15/20 |
| | | | 704/233 |
| 2013/0185078 A1* | 7/2013 | Tzirkel-Hancock | G10L 15/22 |
| | | | 704/275 |
| 2013/0191117 A1* | 7/2013 | Atti | G10L 25/84 |
| | | | 704/226 |
| 2013/0246071 A1* | 9/2013 | Lee | H04W 52/0254 |
| | | | 704/275 |
| 2013/0272511 A1* | 10/2013 | Bouzid | H04M 3/493 |
| | | | 379/88.01 |
| 2014/0067388 A1* | 3/2014 | Manikandan | G10L 15/20 |
| | | | 704/233 |
| 2014/0142951 A1* | 5/2014 | Crawley | G10L 15/22 |
| | | | 704/275 |
| 2014/0270249 A1* | 9/2014 | Jasiuk | G10L 21/0216 |
| | | | 381/94.1 |
| 2014/0278389 A1* | 9/2014 | Zurek | G10L 15/20 |
| | | | 704/231 |
| 2014/0316778 A1* | 10/2014 | Venkatesha | G10L 21/0202 |
| | | | 704/233 |
| 2015/0032451 A1* | 1/2015 | Gunn | G10L 15/063 |
| | | | 704/244 |
| 2015/0039311 A1* | 2/2015 | Clark | G10L 15/063 |
| | | | 704/244 |
| 2015/0170653 A1* | 6/2015 | Berndt | G10L 15/22 |
| | | | 704/275 |
| 2015/0185964 A1* | 7/2015 | Stout | H04N 5/44513 |
| | | | 715/716 |
| 2016/0267924 A1* | 9/2016 | Terao | G10L 25/84 |
| 2016/0275968 A1* | 9/2016 | Terao | G10L 25/84 |
| 2017/0031420 A1* | 2/2017 | Wong | H04W 52/0254 |
| 2017/0053666 A1* | 2/2017 | Konjeti | H04M 1/6058 |
| 2017/0194007 A1* | 7/2017 | Gunn | G10L 15/063 |
| 2017/0372721 A1* | 12/2017 | Jasiuk | G10L 21/0216 |

* cited by examiner

IVR ENGAGEMENTS AND UPFRONT BACKGROUND NOISE

FIELD

The present invention relates to noise detection systems and, more particularly, to systems that detect background noise during a call.

BACKGROUND

Speech analysts frequently encounter upfront background noise that causes utterances to be grammatically incorrect. For example, if a customer calls an interactive voice response (IVR) application, background noise at the customer's location may cause a delay in processing of the call by the IVR application. Thus, an application that reduces or eliminates speech recognition errors due to background noise may be beneficial.

SUMMARY

Certain embodiments of the present invention may provide solutions to the problems and needs in the art that have not yet been fully identified, appreciated, or solved by current IVR applications. For example, embodiments of the present invention pertain to reducing or eliminating speech recognition errors when background noise at the user's location occurs.

In one embodiment, an apparatus is provided. The apparatus includes memory including a set of instructions and at least one processor. The set of instructions, when executed by the at least one processor, are configured to cause the apparatus to detect background noise at a location of a caller and prompt the caller to use dual-tone multi-frequency (DTMF).

In another embodiment, a computer-implemented method is provided. The computer-implemented method includes detecting background noise at a location of a caller and prompting the caller to use DTMF.

In yet another embodiment, a computer program is provided. The computer program is embodied on a non-transitory computer-readable medium. The computer program is configured to cause at least one processor to detect background noise at a location of a caller and prompt the caller to use DTMF

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to reducing or eliminating speech recognition errors when background noise at the caller's location is detected. For example, when background noise at a location of the caller is detected, the caller may be prompted to use dual-tone multi-frequency (DTMF).

Figure 1:
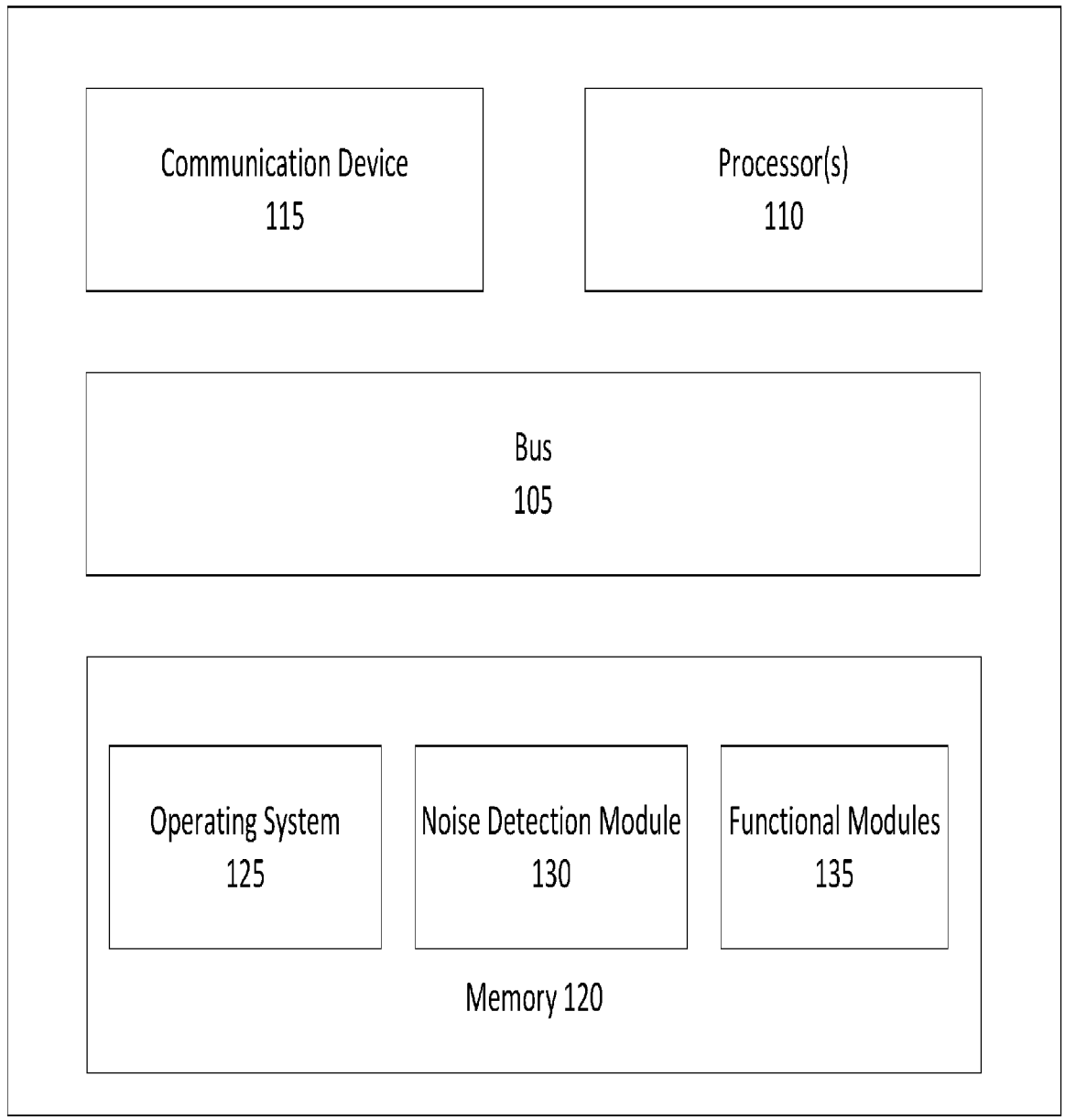
FIG. 1 is a block diagram illustrating a computing system, according to an embodiment of the present invention.

FIG. 1 illustrates a block diagram of a computing system 100, according to one embodiment of the present invention. Computing system 100 includes a bus 105 or other communication mechanism configured to communicate information, and at least one processor 110, coupled to bus 105, that is configured to process information. At least one processor 110 can be any type of general or specific purpose processor. Computing system 100 also includes memory 120 configured to store information and instructions to be executed by at least one processor 110. Memory 120 can be comprised of any combination of random access memory ("RAM"), read only memory ("ROM"), static storage such as a magnetic or optical disk, or any other type of computer readable medium. Computing system 100 also includes a communication device 115, such as a network interface card, configured to provide access to a network.

The computer readable medium may be any available media that can be accessed by at least one processor 110. The computer readable medium may include both volatile and nonvolatile medium, removable and non-removable media, and communication media. The communication media may include computer readable instructions, data structures, program modules, or other data and may include any information delivery media.

According to this embodiment, memory 120 stores software modules that provide functionality when executed by at least one processor 110. The modules include an operating system 125 and a noise detection module 130, as well as other functional modules 135. Operating system 125 may provide operating system functionality for computing system 100. Noise detection module 130 may detect background noise at any time during the call. Because computing system 100 may be part of a larger system, computing system 100 may include one or more additional functional modules 135 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
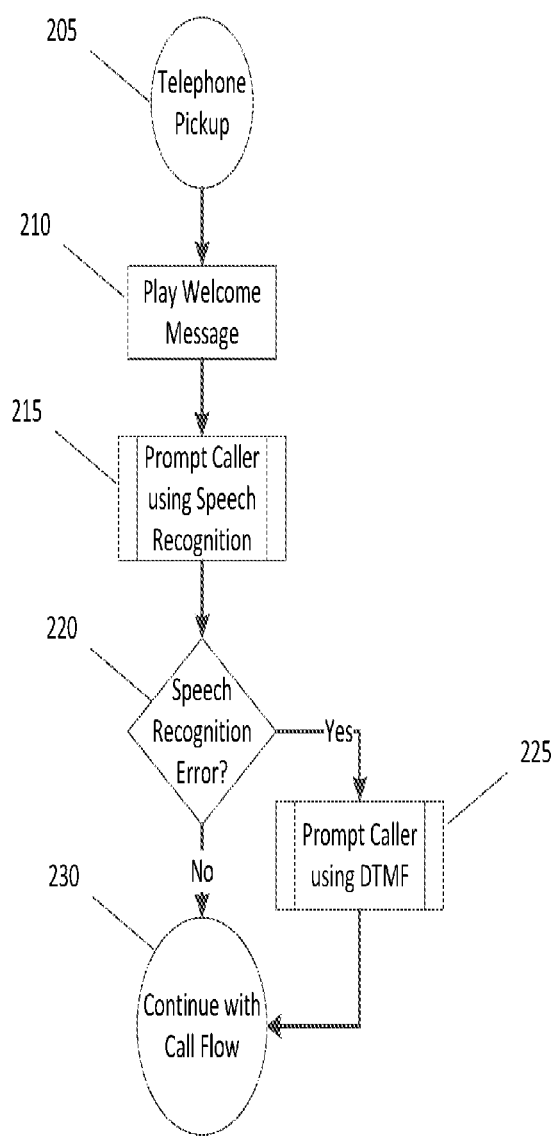
FIG. 2 is flow diagram illustrating a conventional process for detecting an error in speech recognition.

FIG. 2 is flow diagram 200 illustrating a conventional process for detecting an error in speech recognition. The conventional process begins at 205 with an IVR system receiving a call from a caller. At 210, the IVR system plays a welcome message to the caller, and, at 215, prompts the caller using speech recognition. At 220, if the IVR system detects an error during speech recognition, the IVR system prompts the caller to use DTMF at 225. If the IVR system does not detect an error during speech recognition at 220, then the IVR system continues with the voice recognition flow at 230 to connect the caller to an appropriate agent.

The process illustrated in FIG. 2 may encounter a number of problems. For example, depending on the configuration of the IVR, numerous amounts of retries may be provided to the caller when the system cannot recognize the utterance due to background noise at the caller's location. To overcome such problems, the process shown in FIG. 3 is utilized.

Figure 3:
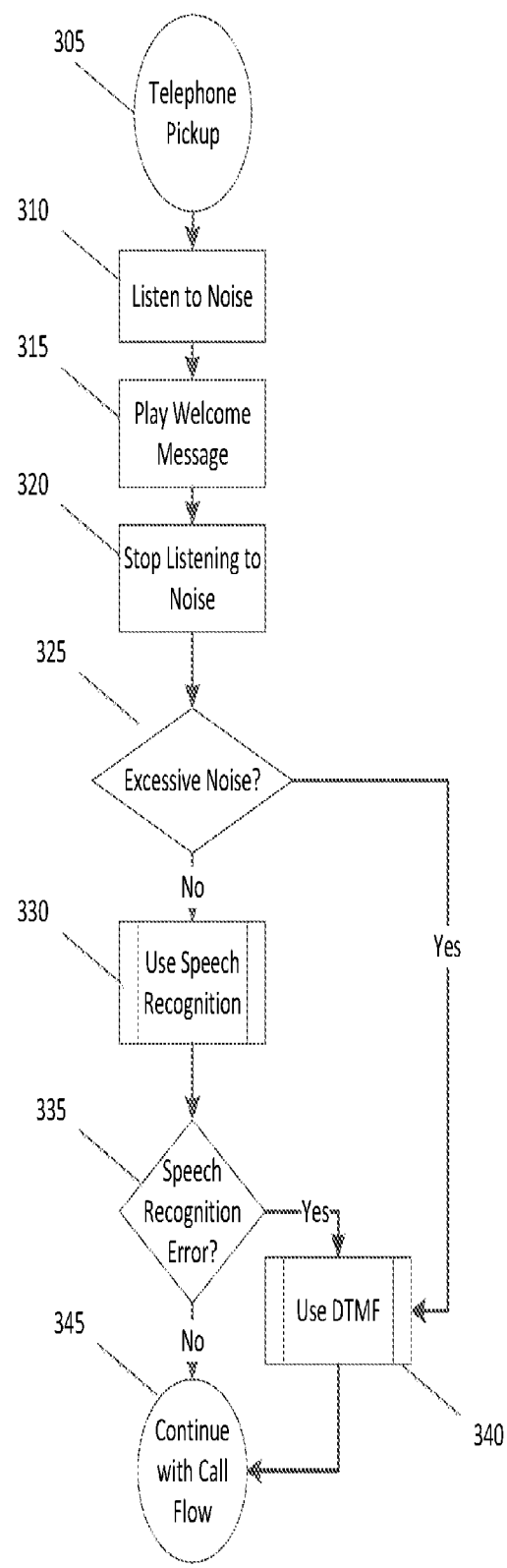
FIG. 3 is a flow diagram illustrating a process for detecting background noise during a call, according to an embodiment of the present invention.

FIG. 3 is a flow diagram 300 illustrating a process for detecting background noise during a call, according to an embodiment of the present invention. The process of FIG. 3 may be executed by, for example, computing system 100 of FIG. 1. In this embodiment, the computing system at 305 receives a call from the caller and, at 310, starts to listen to background noise from a location of the caller prior to playing the welcome message to the caller.

At 315, the computing system plays a welcome message to the user. In certain embodiments, the welcome message is played to the caller when the caller connects to the IVR system. At 320, the computing system stops listening to the background noise at the location of the caller, and, at 325, determines whether the background noise is excessive. For example, the computing system may detect whether the location of the caller contains a sufficient degree of background noise such that successful speech recognition is impossible. This may be measured, for example, by a signal strength of the background noise, a number of decibels of the background noise, or any other noise analysis technique that would be understood by one of ordinary skill in the art.

If the computing system detects excessive background noise, then at 340 the caller is prompted to use DTMF to complete the call flow to connect, for example, to the agent.

If the computing system does not detect excessive background noise at 325, then at 330, the caller is prompted using the speech recognition.

At 335, the computing system detects whether speech recognition error has occurred. If speech recognition error has occurred, then at 340, the caller is prompted to use DTMF to complete the call flow to connect, for example, to the agent. Otherwise, the call flow continues at 345 to connect the user to, for example, the agent.

It should be appreciated that in certain embodiments, the background noise detection is activated throughout the call to ensure that the caller is connected to the agent promptly. The embodiments discussed herein may reduce caller frustration and shorten the call length. Furthermore, by detecting noisy environments, a greater insight is provided into how well speech recognition works in an ideal environment and how often callers are not calling from an ideal environment.

The processes shown in FIGS. 2 and 3 may be performed, in part, by a computer program, encoding instructions for a nonlinear adaptive processor to cause at least the processes described in FIGS. 2 and 3 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 2 and 3, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An apparatus, comprising:
a memory comprising a set of instructions; and
at least one processor, wherein the set of instructions, when executed by the at least one processor, are configured to cause the apparatus to:
play a welcome message to a caller based on background noise from a location of a call;
determine whether a sufficient degree of background noise at the location of the call would make speech recognition impossible based on decibels of the background noise; and
prompt the caller to use dual-tone multi-frequency (DTMF) based on the decibels of the background noise being above a threshold.

2. The apparatus of claim 1 wherein the set of instructions, when executed by the at least one processor, are configured to cause the apparatus to listen for the background noise at the location of the caller.

3. The apparatus of claim 1 wherein the set of instructions, when executed by the at least one processor, are configured to cause the apparatus to listen for the background noise at the location of the caller when a call is received.

4. The apparatus of claim 3, wherein the set of instructions, when executed by the at least one processor, are configured to cause the apparatus to instruct the caller to use speech recognition during the call when the background noise is not excessive.

5. The apparatus of claim 3, wherein the set of instructions, when executed by the at least one processor, are configured to cause the apparatus to determine whether a speech recognition error occurred during the call.

6. The apparatus of claim 3, wherein the set of instructions, when executed by the at least one processor, are configured to cause the apparatus to instruct the caller to use the DTMF when a speech recognition error is detected during the call.

7. The apparatus of claim 1 wherein the set of instructions, when executed by the at least one processor, are configured to cause the apparatus to prompt the caller to use the DTMF when the decibels of the background noise are determined to be excessive.

8. A computer-implemented method, comprising:
playing a welcome message to a caller based on background noise from a location of a call;
determining whether a sufficient degree of background noise at the location of the caller would make speech recognition impossible based on decibels of the background noise; and
prompting, by the computing system, a use of dual-tone multi-frequency (DTMF) when the decibels of the background noise are excessive.

9. The computer-implemented method of claim 8, further comprising listening, by a computing system, for the background noise at the location.

10. The computer-implemented method of claim 9, further comprising listening, by a computing system, for the background noise at the location when a call is received.

11. The computer-implemented method of claim 10, further comprising instructing a caller, by the computing system, to use speech recognition during the call when the background noise is not excessive.

12. The computer-implemented method of claim 10, further comprising determining, by the computing system, whether a speech recognition error occurred during the call.

13. The computer-implemented method of claim 10, further comprising instructing a caller, by the computing system, to use the DTMF when a speech recognition error is detected during the call.

14. The computer-implemented method of claim 10, further comprising instructing a caller, by the computing system, to use the DTMF when the signal strength of the background noise is determined to be excessive.

15. A computer program embodied on a non-transitory computer-readable medium, the computer program configured to cause at least one processor to:
play a welcome message to a caller based on background noise from a location of a call;
determine whether a sufficient degree of background noise at the location of the call would make speech recognition impossible based on decibels of the background noise; and
prompt the caller to use dual-tone multi-frequency (DTMF) when the decibels of the background noise are excessive.

16. The non-transitory computer-readable medium of claim 15, wherein the computer program is further configured to cause the at least one processor to listen for background noise at the location of the caller.

17. The non-transitory computer-readable medium of claim 15, wherein the computer program is further configured to cause the at least one processor to listen for background noise at the location of the caller when a call is received.

18. The non-transitory computer-readable medium of claim 17, wherein the computer program is further configured to cause the at least one processor to instruct the caller to use speech recognition during the call when the background noise is not excessive.

19. The non-transitory computer-readable medium of claim 17, wherein the computer program is further configured to cause the at least one processor to determine whether speech recognition error occurred during the call.

20. The non-transitory computer-readable medium of claim 15, wherein the computer program is further configured to cause the at least one processor to instruct the caller to use the DTMF when a speech recognition error is detected during the call.

* * * * *